(No Model.) 2 Sheets—Sheet 1.
J. F. MORELL.
JOURNAL BOX AND BEARING.
No. 415,547. Patented Nov. 19, 1889.
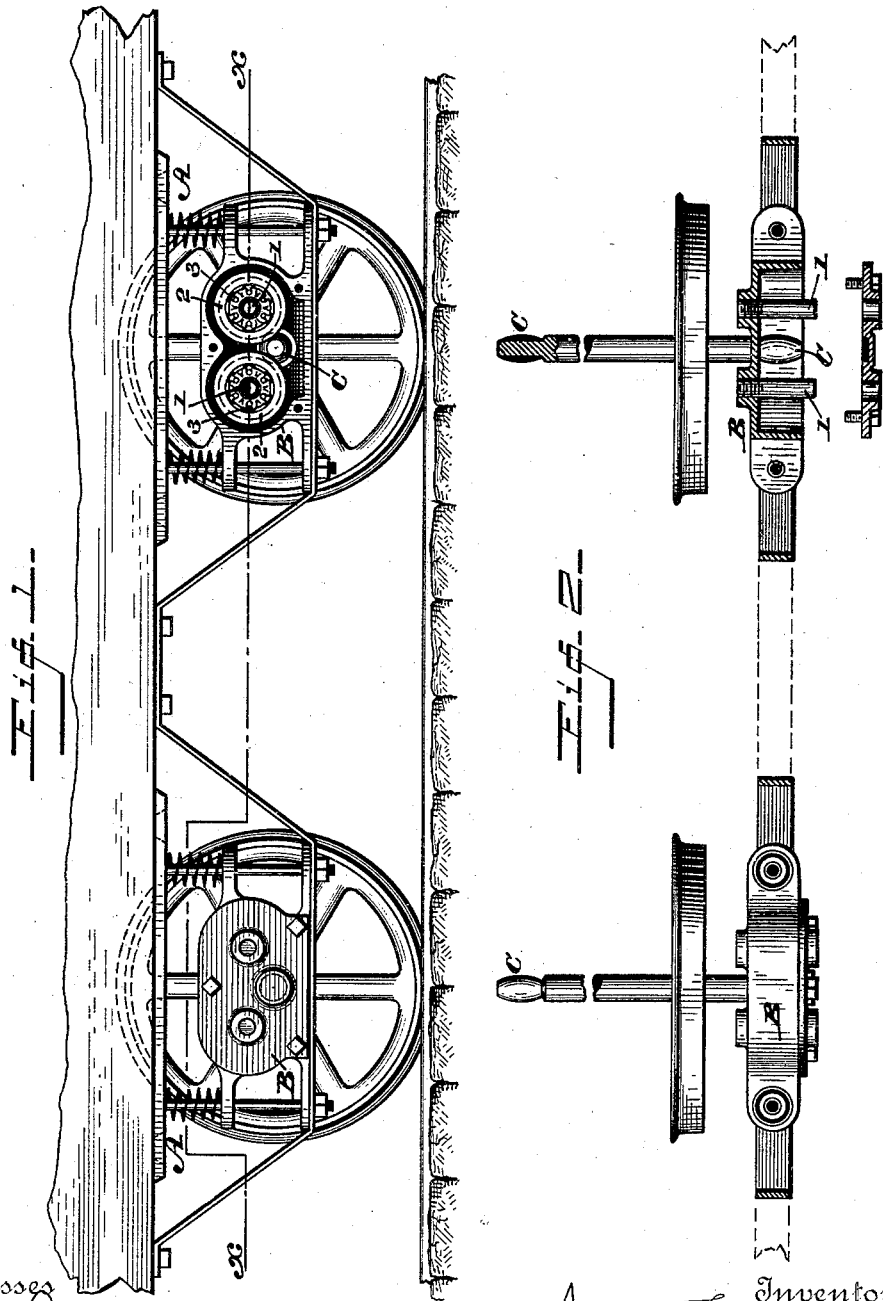
Witnesses
L. Douville,
A. P. Jennings.
Inventor
James F. Morell
By his Attorneys
Wiedersheim & Fairbanks (No Model.) 2 Sheets—Sheet 2.
J. F. MORELL.
JOURNAL BOX AND BEARING.
No. 415,547. Patented Nov. 19, 1889.
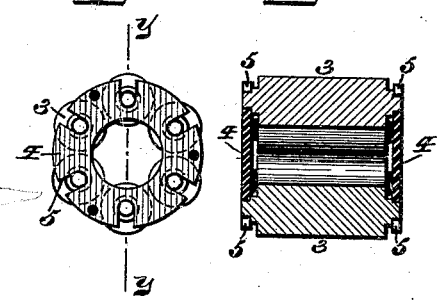
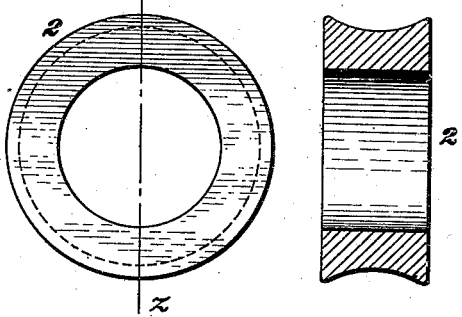
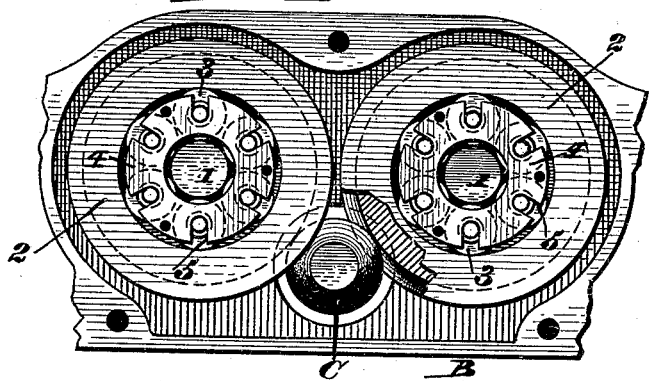
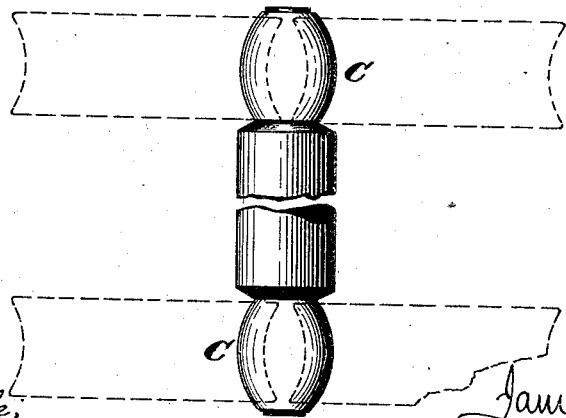
Witnesses
L. Douville,
A. P. Jennings.
Inventor
James F. Morell.
By his Attorneys
Giebersheim & Lintner
N. PETERS, Photo-Lithographer, Washington, D. C.

UNITED STATES PATENT OFFICE.

JAMES F. MORELL, OF CAMDEN, NEW JERSEY.

JOURNAL BOX AND BEARING.

SPECIFICATION forming part of Letters Patent No. 415,547, dated November 19, 1889.

Application filed February 1, 1889. Serial No. 298,388. (No model.)

*To all whom it may concern:*

Be it known that I, JAMES F. MORELL, a citizen of the United States, residing in the city and county of Camden, State of New Jersey, have invented a new and useful Improvement in Anti-Friction Journals, Journal Boxes and Bearings, which improvement is fully set forth in the following specification and accompanying drawings.

My invention consists of improvements in anti-friction journals, journal boxes and bearings for cars or other vehicles, embodying drums or rollers within the boxes and journals in contact with the same, said journals being of such form as to roll upon said drums, whose peripheries are correspondingly shaped.

It also consists of the novel construction of the drums or rollers, as will be hereinafter fully set forth.

Figure 1 represents a partial side elevation and partial vertical section of anti-friction journals, journal boxes and bearings embodying my invention. Fig. 2 represents a partial top view and partial horizontal section thereof on line $x\,x$, Fig. 1. Fig. 3 represents a view of auxiliary friction-rollers employed. Fig. 4 represents a section thereof on line $y\,y$. Fig. 5 represents a view of one of the hollow friction-rollers employed. Fig. 6 represents a section thereof on line $z\,z$, Fig. 5, Figs. 3, 4, 5, and 6 being on an enlarged scale. Fig. 7 represents a view of the journals, journal boxes and bearings on an enlarged scale. Fig. 8 represents a view of the journal on an enlarged scale.

Similar letters and numerals of reference indicate corresponding parts in the several figures.

Referring to the drawings, A designates the pedestal of a car, and B represents a box which is fitted within said pedestal and capable of vertical motions therein. Mounted within the box on axles 1 are friction cylinders or rollers 2, which are placed side by side and rested upon the journal C of the car-axle, said journal being of the form of the frustum of a circular spindle, as shown in Figs. 2 and 8, and said cylinders having their peripheries concave, so as to conform to the shape of the journal C. The axles 1 are connected with the box B, as will be most clearly shown in Fig. 2. The drums are hollow and contain a series of rollers 3, which are arranged around the axle 1 and mounted upon heads 4, the latter being provided with radial slots 5 to receive the journal of said rollers 3, it being noticed that said rollers 3 are in contact with the inner peripheries of the rims of the cylinders or rollers 2.

When the car is in motion, the rollers 2 rotate in contact with the journal C, and the rollers 3, which are interposed between the rim of said rollers 2 and the axle 1, revolve in contact with said rollers 2 and axle 1, whereby the journal rotates with reduced friction on its bearings, which are the rollers 2, as has been stated, it being seen that the rollers 2, which are hollow or formed of rims, as set forth, are strengthened or braced and sustained by the rollers 3, whereby crushing or breaking of said rollers 2 is prevented.

Owing to the construction of the journal of the form of the frustum of a circular spindle and the concave peripheries of the rollers 2, said journals are permitted to roll on their bearings, thus relieving the journals of strain during the oscillation or swaying of the car, and preventing binding of the journal with its bearings. The engagement of the peripheries of the rollers 2 with the journal C also serves to retain said rollers in position, avoiding the contact of the latter with the box and consequent friction therewith.

Having thus described my invention, what I claim as new, and desire to secure by Letters Patent, is—

1. A journal of the form of a frustum of a circular spindle, and a bearing-roller for the same having a concave periphery to receive said journal, combined and operating substantially as described.

2. A hollow friction-roller for a journal or axle, containing a circle of friction-rollers and having a concave periphery, in combination with a journal of the form of a frustum of a circular spindle occupying said concave periphery, substantially as described.

3. The combination of the journal C with the hollow rollers 2, the axles 1 within said hollow rollers, and anti-friction rollers within said hollow rollers and bearing on the inner face of said rollers 2 and on the axles 1, substantially as and for the purpose set forth.

JAMES F. MORELL.

Witnesses:
JOHN A. WIEDERSHEIM,
JAMES F. KELLY.